United States Patent [19]

Mikami et al.

[11] Patent Number: 5,467,199
[45] Date of Patent: Nov. 14, 1995

[54] APPARATUS FOR RADIO COMMUNICATION OF FACSIMILE

[75] Inventors: Shigeru Mikami, Asashi; Masayuki Mori, Kobe; Tetsuo Yamamoto, Yao; Matsuhiro Ohno, Takarazuka; Mineo Matsumoto, Akashi, all of Japan

[73] Assignee: Furuno Electric Company, Limited, Nishionmiya, Japan

[21] Appl. No.: 324,488

[22] Filed: Oct. 18, 1994

Related U.S. Application Data

[63] Continuation of Ser. No. 862,551, filed as PCT/JP91/01630, Nov. 27, 1991, abandoned.

[30] Foreign Application Priority Data

Nov. 28, 1990 [JP] Japan ................................ 2-332254

[51] Int. Cl.⁶ ...................................................... H04N 1/00
[52] U.S. Cl. ........................... 358/425; 358/435; 375/301; 375/321; 370/29; 370/32
[58] Field of Search ................................ 358/400, 425, 358/434, 435, 436, 438, 439, 442, 469; 375/59, 61, 75, 77, 97; 370/29, 32, 53, 58.1

[56] References Cited

U.S. PATENT DOCUMENTS 4,749,825  6/1988  Stewart et al. .
4,933,770  6/1990  DeSpain ............................... 358/434

FOREIGN PATENT DOCUMENTS 51-35327  10/1976  Japan .
53-107212  9/1978  Japan .
59-211334  11/1984  Japan .

*Primary Examiner*—Bentsu Ro
*Attorney, Agent, or Firm*—Armstrong, Westerman, Hattori, McLeland & Naughton

[57] ABSTRACT

Tone signal (34a) having a reference frequency (f) which is produced by the tone signal generation device (34) at the transmitter part is transmitted, via transmitter device (32), antenna (31), aerial line, antenna (32), to the reception sector (12). Then, the received tone signal (12a) is compared by the frequency correction circuit (A) with the preset reference signal (f), and according to a result of the comparison, a frequency produced by the reception sector (12) is corrected. That is, an error produced between the transmission frequency by the transmitter (32) and the reception frequency by the receiver (12) is apparently canceled. Thereby facsimile data can be transmitted so correctly to the receiver part so that the facsimile communication with use of radio SSB system can be successfully applied, although there may be an error between the transmitter frequency and the receiver frequency.

11 Claims, 3 Drawing Sheets

APPARATUS FOR RADIO COMMUNICATION OF FACSIMILE

This application is a continuation of application Ser. No. 07/862,551 filed as PCT/JP91/01630, Nov. 27, 1991, now abandoned.

TECHNICAL FIELD

This invention relates to the radio communication of facsimile in which documentary materials are transmitted by the radio SSB (single sideband) system from transmitters to receivers.

BACKGROUND ART

Fishing boats, for example, would be guarded safe in fishing sailings if information, for example, a weather map is available while off shore, and therefore they make it a practice to equip the facilities to communicate such information as a weather map by radio facsimile communications. Accordingly, the radio communications systems on board are designed to work as radio phone and also as radio facsimile by a switchover operation or like, wherein the radio phone system handles audio sound waves and the radio facsimile system handles the signals produced by scanning over images drawn on papers or like, but in no case the facsimile system has any separate utility of handling the signals differently derived from voice or sound waves.

In the case where the SSB system is applied to the facsimile communication for the merit that the SSB system can cover a longer distance, difficulties have been found. That is, when some disagreement or error arises at the receiver's frequency as compared with the transmitter's frequency, such an error causes the phenomena distinctive to the SSB system, that is, the receiver's demodulated signals for the facsimile will have a frequency with an error correspondent to the error arisen in the transmission.

In the meantime, the data transmission by the facsimile is required to meet the strict standard which provides that the allowable error range in frequency should be within several Hz in the communications. Therefore, in the case of carrying out the facsimile communication by the radio SSB transmission system, an error between the transmitter's frequency and the receiver's frequency for facsimile signals should be controlled within several Hz.

However, the SSB system which has been generally employed for the merit of lower cost facilities is difficult to meet the strict provision as noted, and as a result, a communication facilities requiring higher cost can not be dispensed from the facsimile system. In other words, for the reason of cost problem, the facsimile system has been impeded from a level of popular use or further popularization.

This invention has proceeded from the background as noted above and has an object of offering a facsimile communication apparatus which enables superior facsimile communication with use of the radio SSB system, with overcoming the conventional problem of an frequency error between a transmitter and a receiver.

DISCLOSURE OF THE INVENTION

The facsimile communication apparatus of the present invention is defined as noted below. That is, at a transmitter part, a transmission sector is provided for producing SSB signals by modulating signals for documentary materials which come from a facsimile device at the transmitter part, and at a receiver part, a reception sector is provided for demodulating the SSB signals and then reproducing the signals for documentary materials which will go to a facsimile device at the receiver part. And therein a standard or reference frequency f which the transmitter has previously set up is facilitated to transmit, via the transmission sector and intermediate aerial antennas, to the reception sector of a receiver wherein actual received reference frequency is compared with the same reference frequency f which has been preset at the reception sector and an output frequency from the reception sector leading to the receiver's facsimile device is adjusted according to a result of the comparison at the reception sector.

In such a situation as noted above, it is assumed that there is an error +a between the transmitter's sendout frequency at the transmission sector and the receiver's intake frequency at the reception sector, and further that a reference frequency f which has been preset is transmitted, this reference is actually received at the receiver as a frequency f-a, which is compared with the reference f at the reception sector of the receiver and thereby the error a is found. Thereupon, assuming that the output from the reception sector is corrected by +a, the error between the transmitter and the receiver is canceled apparently so that the information or data on transmitter's documentary materials is correctly reproduced at the receiver's facsimile. Accordingly, the radio SSB communication system can be applied to the facsimile communication system, allowing for a possible trouble that such a system contains an error in frequency between a transmitter and a receiver. In other words, in contrast to the conventional circumstances, the SSB system which features low cost facilities may be employed to the facsimile communications and as a result the facsimile system will find more popularization, avoiding the cost problem.

BRIEF DESCRIPTION OF THE DRAWINGS

FIGS. 1 to 3 are diagrams to explain an embodiment of the present invention, wherein FIG. 1 is a block diagram to generally show electrical structures of the apparatus involved, FIG. 2 is a flow chart to explain acts included in a receiver part, and FIG. 3 is a flow chart to explain acts included in a transmitter part.

Below, the invention will be described with reference drawings.

BEST MODE TO CARRY OUT THE INVENTION

Figure 1:
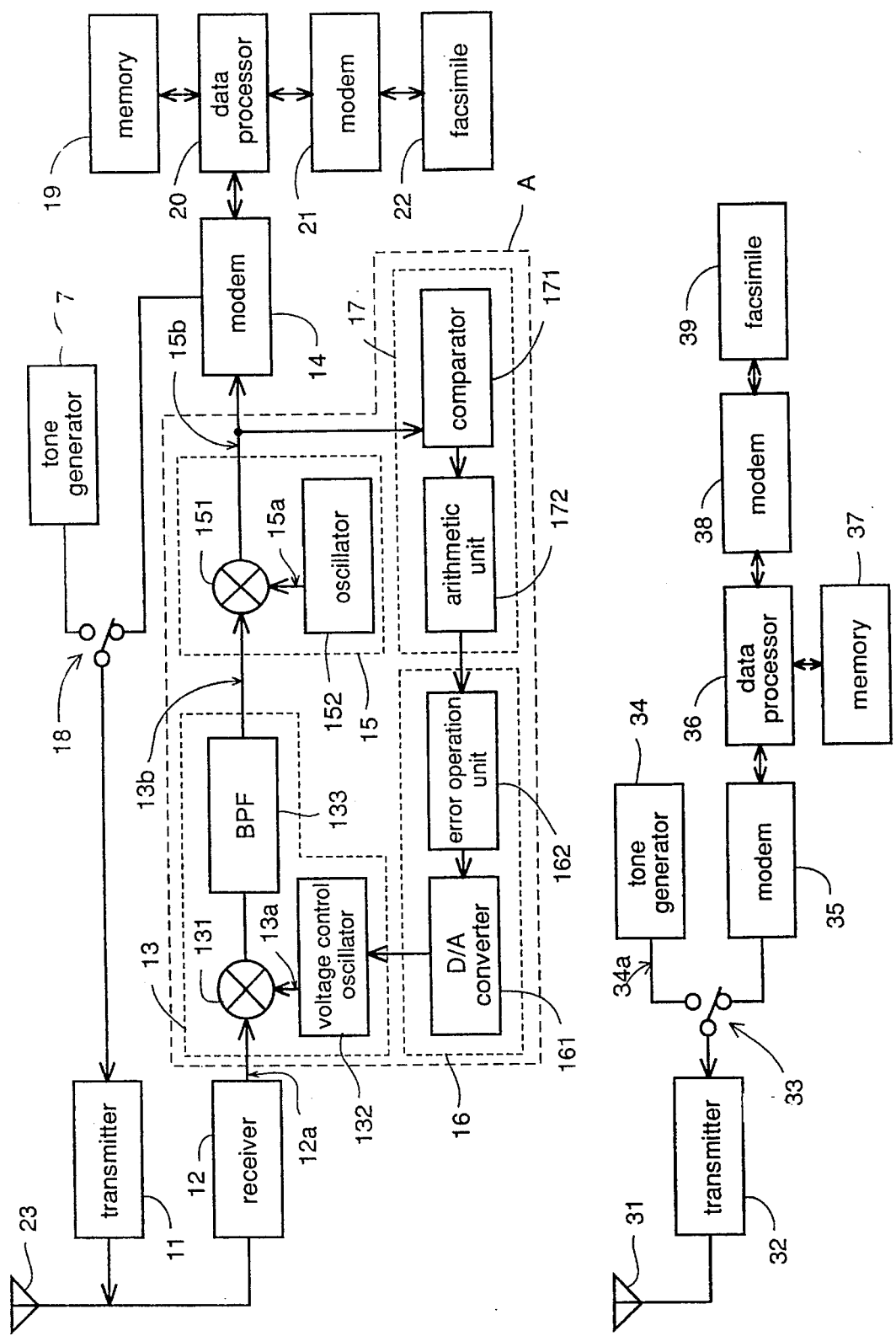

FIG. 1 includes two parts: the block diagram noted upper is structured of the blocks 11 to 22 (except 23), and the block diagram noted under is structured of the blocks 32 to 39 (except 31), wherein the apparatus noted upper contains the transmission sector comprising the blocks 11 (this represents the transmission sector), 18, 17, 14, 19, 20, 21, and 22, and also the reception sector comprising the blocks (this represents the reception sector), 131, 132, 133, 151, 152, 171, 172, 162, 161, 14, 19, 20, 21, and 22. And there are five areas enclosed by dotted lines numbered: 13, 15, 16, 17, and A. These enclosures are formed for convenience in explanation which will be brought out later.

The apparatus noted under only contains the transmission sector comprising the blocks 32 (this represents the transmission sector), 33, 34, 35, 36, 37, 38, 39 (except 31), wherein, as is understood, the apparatus under lacks the block enclosure A of the apparatus upper, that is, the reception sector is not shown in the apparatus under, of which related explanation will be given later.

Herein, the description will be given on the case where a facsimile material or information is transmitted from the apparatus under (transmitter) to the apparatus upper (receiver).

First, the reference is made to the apparatus under (transmitter). A facsimile 39 has an output connected, via modem 38, data processor 36, memory 37 branched from the data processor 36, modem 35 and switch 33, to a transmitter device 32, of which output is extended to an antenna 31. The switch 33 has two contacts, of which another contract is connected to a reference tone generator 34 which will produce the preset tone 34a. Herein, the tone frequency f is set to have 1500 Hz, and it is assumed that the same frequency 1500 Hz is provided with a tone generator 7 at the receiver part which will appear later.

Then, assuming that the facsimile 39 issues a sendout request via the modem 38, the switch 33 switches the contact to the tone generator 34 before a start of the operational session for transmitting a facsimile material, and the tone signal 34a is modulated by the transmitter 32 and the modulated tone in form of SSB signals is radio transmitted from the antenna 31. In turn, at the start of transmission of the facsimile signals, the switch 33 is switched to the modem 35 after the tone transmission is finished. Then, the signals of the documentary material by the facsimile 39 are fed, via modem 38, data processor 36, modem 35, switch 33, to the transmitter device 32, wherein the transmitter 32 produces the modulated SSB signals from original signals of the facsimile material and the SSB signals are transmitted from the antenna 31.

Therein, the data processor 36 is connected with the two modem 35, 38 and the memory 37 with bi-directionality, and the facsimile 39 is likewise connected with the modem 38 with bi-directionality.

Note: The bi-directionality is noted in FIG. 1 by a two headed arrow.

Turning to the reference to the apparatus upper (receiver), The antenna 23 is connected with the reception sector represented by the receiver device 12 of which output is fed to a frequency correction or interface circuit A (one of the dotted line enclosures), and in sequence, modem 14, data processor 20, modem 21, and then to the facsimile 22, wherein the received SSB signals from the transmitter part are demodulated at the receiver 12 and thereby the reproduced signals 12a including tone signal and the facsimile signals are fed to the interface circuit A, and in sequence, modem 14, data processor 20, modem 21, and then to the facsimile 22, through whose acts the transmitter's material is reproduced. In the meantime, based on the received tone signal 12a, an output frequency from the receiver 12 is corrected by function of the frequency correction or interface circuit A.

Below, the frequency correction circuit A will be detailed. This interface circuit A is located at an intermediate stage in the process from the receiver device 12 to the modem 14 or the facsimile 22 and includes four parts (each is enclosed by a dotted line in FIG. 1): an SSB modulation part 13, SSB demodulation part 15, frequency detection part. 17, frequency control part 16. Specifically the SSB modulation part 13 includes three devices (each is noted by a block in FIG. 1): a multiplier 131, oscillator for voltage control 132, band pass filter 133. The SSB demodulation part 15 includes two devices: a multiplier 151, an oscillator 152. The frequency control part 16 includes two devices: a D/A convertor 161, an error operation unit 162. The frequency detection part 17 includes two devices: comparator 171, arithmetic unit 172, wherein the line defined of 131, 133, 151, to 14 (out of A) is a main forwarding route. And the line defined of 151, 171, 172, 162, 161, 132, to 131 is a feed back route.

Then, referring to how the tone signal is treated by the circuit A in order to understand the structure thereof, first the tone signal 12a reproduced or demodulated by the receiver 12 is fed to the multiplier or a kind of modulator 131, of which output is fed to the band filter 133 having a narrow filter width at 455 KHz. The output from the band pass filter 133, that is, SSB tone signal 13b is sent to the multiplier or a kind of demodulator 151, of which output, that is, demodulated tone signal 15b is sent to both the modem 14 (main forwarding) and the comparator 171 (feed back). Output from the comparator 171 is led to the arithmetic unit 172, of which output is led to the error operation unit 162, and output from this unit 162 is led to the D/A convertor 161, of which output is led to the voltage control oscillator 132 which is an oscillator based on the crystal, known as VXO, in abbreviation. The output from the voltage control oscillator 132 is led to the multiplier 131 with a first signal 13a as carrier wave. In the meantime, output from the oscillator 152 is led to the multiplier 151 with a second signal 15a as beat signal.

Then, the modem 21 is connected bidirectional with the facsimile 22 and also with the data processor 20, and this processor 20 has bi-directionality with the modem 14 as well as the memory 19.

In the ease where the apparatus upper is used as transmitter from the facsimile 22, the transmission sector is provided with the connection of the facsimile 22 to modem 14 and to switch 18 and further to transmitter 11, which are equivalent to corresponding devices (32, 33, 35, 36, 37, 38, and 39) included in the apparatus under.

Therein, the transmitter 11, 32, receiver 12 are equivalent to commercialized devices, that is, transceiver (or Walkie Talkie), and the facsimiles 22, 39 are also commercialized, widely used. Since these units or devices are available from commercial articles: feasibility of the present invention is greatly eased. These commercial articles may be included, without the trouble of any partial reconstruction, into the present invention.

And the tone signal generator 17, data processor 20, arithmetic unit 172 and error operation unit 162 are structured of software which are executed by a microcomputer.

Figure 2:
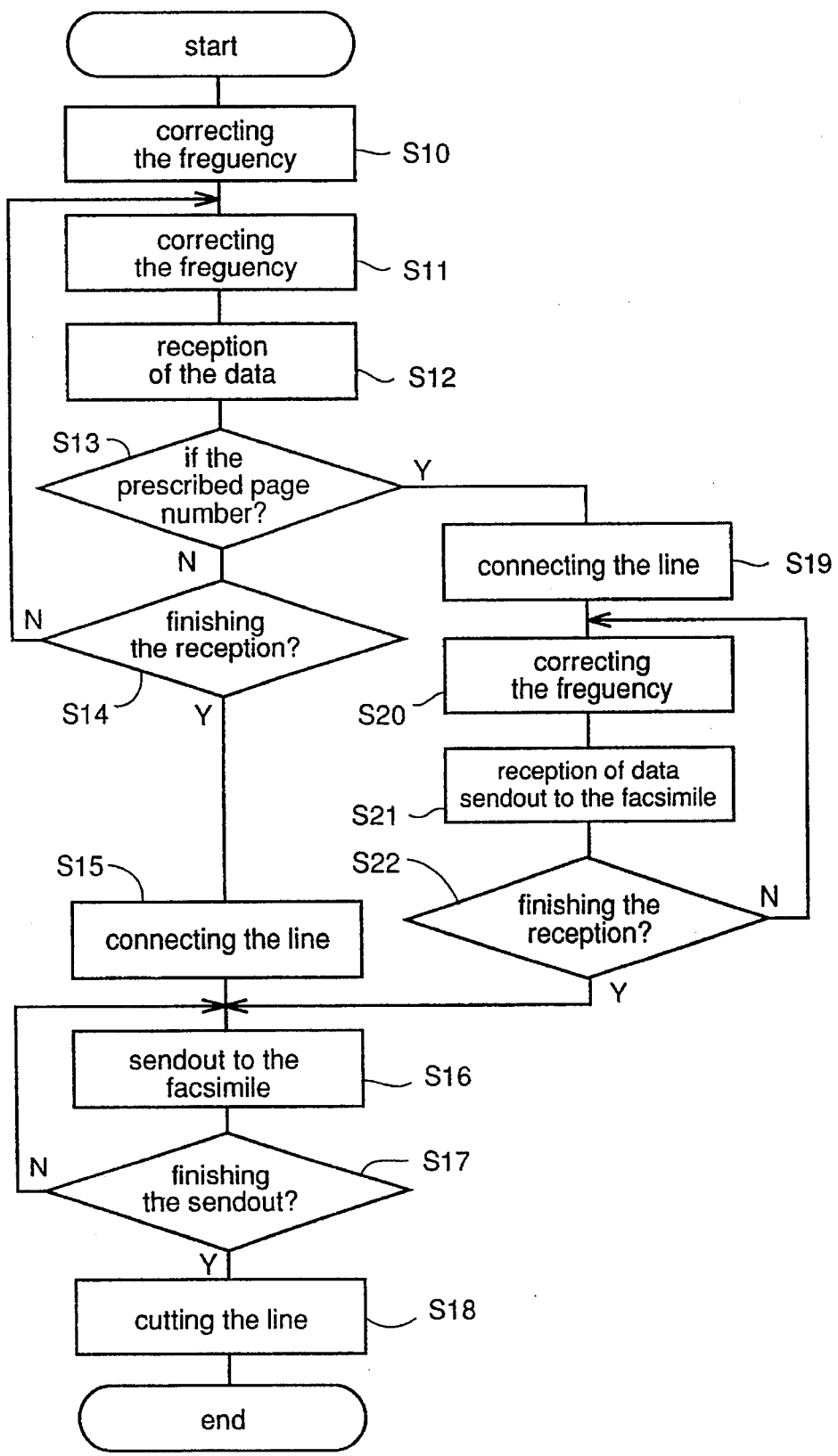
Figure 3:
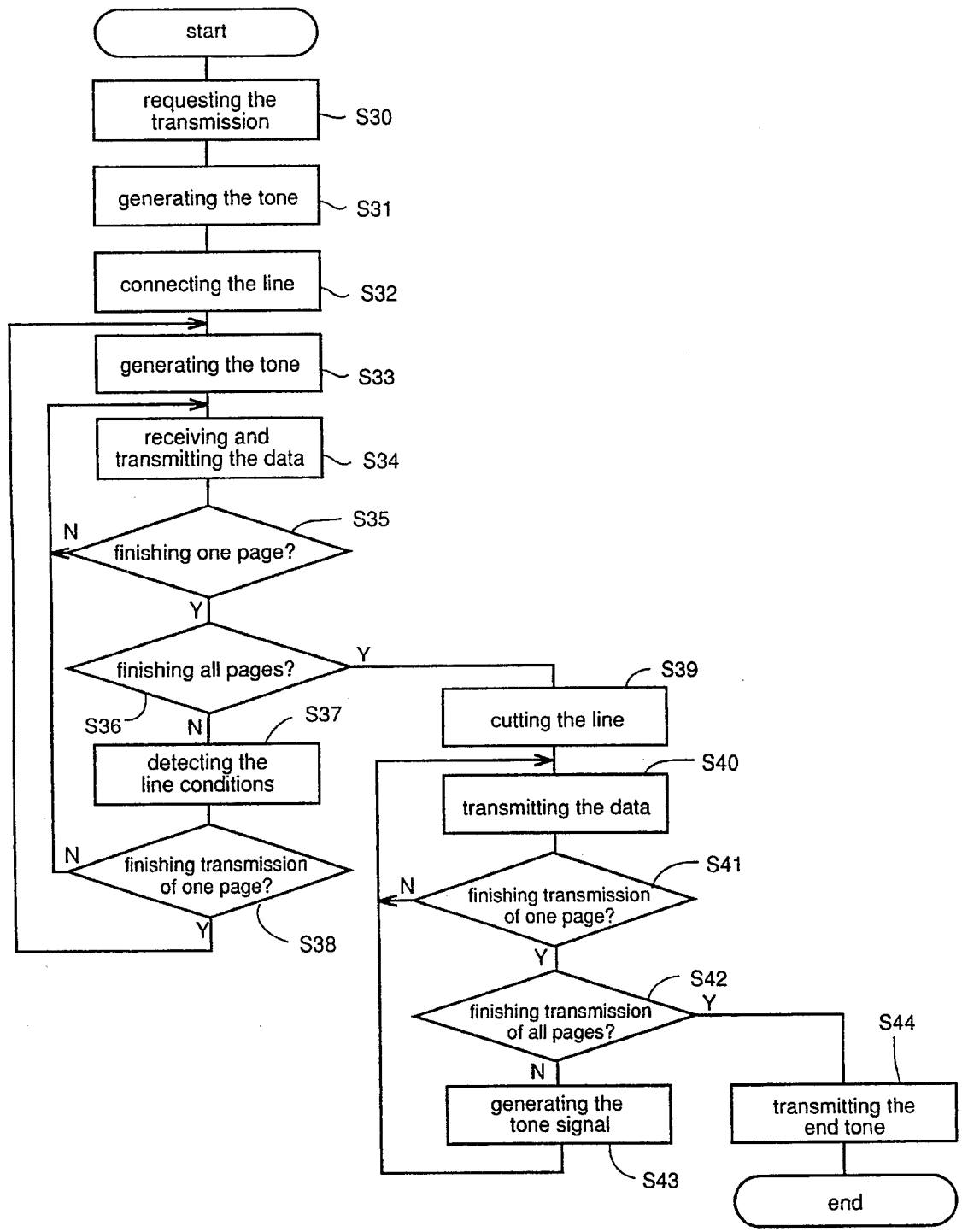

The details of operations involved in the embodiment, that is, radio facsimile communication system will be given with reference to FIG. 1 to 3, wherein, as for numbered steps, the reference will be found in FIG. 2 or 3.

From the transmitter part, that is, from the apparatus under, a sendout request is transmitted from the facsimile 39 via the modem 38, and, prior to transmission of a documentary material, the switch 33 is switched to contact the tone generator 34, and thereby the tone signal 34a is fed from the tone generator 34 to the transmitter 32 (step 30, step 31). The tone signal 34a is modulated at the transmitter 32 and dispatched from the antenna 31 in the SSB formed tone signal.

On the other hand, at the receiver part, that is, at the apparatus upper, the tone signal is received by the antenna 23 and is demodulated by the receiver 12, and thus the demodulated tone signal 12a is fed to the multiplier 131, which converts the signal 12a into DSB signal (again modulated). In turn, this DBS signal passes the band pass filter (BPF) 133 wherein one side wave is removed to return to SSB signal 13*b*, which is then fed to the multiplier 151 and is output as demodulated tone 15*b* leading to the modem 14 (again demodulated).

In the process so far, it is assumed that a frequency at the transmitter 32 is Ftx and a frequency at the receiver 12 is Frx, $$Frx=Ftx$$

should be logically obtained, but actually for the cause of inaccuracy and/or inequality borne with parts incorporated in both transmitter and receiver apparatus, for example, inequality of each reference frequency produced by each apparatus, thereby an error is produced. Now it is assumed that Ftx and Frx are related as below:

$$Frx=Ftx+20$$

Accordingly, tone signal 12*a* leading to the multiplier 131 has a frequency Ft1 as below:

$$Ft1=1500-20=1480$$

(assuming that as SSB wave, upper side band is used)

Further, assuming that the first signal 13*a*, that is, output from the voltage control oscillator 132 has a frequency Fval, and the second signal 15*a*, that is, output from the oscillator 152 has a frequency Ffix, related devices are adjusted at the initial stage to hold:

$$Fval=Ffix$$

That is, the tone signal 1500 Hz is assumed to arrive without any change in the frequency. But as noted above, when the demodulated signal 15*b* is assumed to have a frequency Ft2;

$$Ft2=Ft1=1480$$

Part of the demodulated signal 15*b* is remained or fed back in A, that is, fed to the comparator 171 for conversion into pulse signal, which is then fed to the arithmetic unit 172 where the frequency is counted and the result 480 Hz is fed to the error operation unit 162. This unit 162 operates on the difference in frequency found between the original reference 1500 and actual reference 1480 and outputs a value correspondent to the difference to the D/A convertor 161 so that a signal to change a voltage should feed to the voltage control oscillator 132, and thereby:

$$Fval=Ffix+20$$

is set up. Resultantly SSB tone signal 13*b* increases 20 Hz in frequency, which causes the frequency Ft2 of the modulated tone signal 15*b* to increase 20 Hz (as noted above, the SSB tone signal has become the upper side band), that is:

$$Ft2=1500$$

Thus, the frequency of the tone signal 34*a* produced by the tone generator at the transmitter sector is correctly reproduced and the same frequency 1500 Hz is led to the modem 14 (step 10).

Adjustment or correction of the frequency is finished by the feed back process as noted above, and the corrected state will be maintained. Then the data processor 36 of the transmitter is initialized to the facsimile 39 (step 32). In turn, the tone signal 34*a* is again dispatched (step 33), and the same frequency correction is re-executed at the receiver (step 11).

After the tone signal 34*a* has been dispatched and the correction of the frequency has ended, the switch 33 is switched to the modem 35, and thereby the modem 35 and the transmitter 32 are connected, the data processor 36 starts receiving the data of a documentary material from the modem 38 and thus from the facsimile 39, and simultaneously starts sending the received data to the modem 35 and thus to the transmitter 32 for further sendout to the receiver (step 34).

At the receiver part, the demodulated tone signal 15*b* is fed to the modem 14 and thereby the data is processed by the data processor 20 (step 12).

In the meantime, at the transmitter part, each time the data for covering one page of the documentary material from the facsimile 39 has been processed to an end, conditions of the communication line are checked including the recheck of the reference frequency with the consideration that the error between the transmitter and the receiver may take place before all pages have been processed. That is, the transmission of the tone signal 34*a* is repeatedly done at each end of one page job (step 33 to 38).

In executing these acts, execution of the tone signal 34*a* requires a few seconds. In the meantime, on the facsimile line, that is, between an amount of intake data from the facsimile 39 and an amount of sendout data, the intake data increases over the same sendout, wherein such a difference between the reception and transmission is adjusted or buffered by storing the differential data into the memory 37. When the data from the facsimile 39 is finished of its sendout, the line connection to the facsimile 39 is cut off (step 36, 39). Thereafter the remnant data stored in the memory 37 is transmitted, in which operation the recheck of the reference frequency is likewise executed by sending the tone signal 34*a* each time one page data is finished (step 40 to 43).

When the acts as noted have ended, that is, one session of the transmission job is finished, an end tone to indicate the end of data sendout is transmitted (step 42, 44). At the data processor 20 of the receiver part, the data fed from the modem 14 is first stored into the memory 19, and each time one page data is finished of its reception, the recheck of the reference frequency is executed repeatedly (step 11 to 14).

In the acts as noted above, if the end tone is received when the memory 19 stores under its memory capacity, the operation proceeds from step 14 to step 15, that is, the line is connected to the facsimile 22 via the modem 21 and then the data stored in the memory 19 is transmitted to the facsimile 22. When this transmission of the data has ended, the line to the facsimile 22 is cut and thereby a series of the operation ends (step 16 to 18).

However, if the memory 19 has stored the data up to its capacity by reception of the data, the operation proceeds from step 13 to step 19, that is, the line is connected to the facsimile 22 via the modem 21 (step 19), and operations including the frequency adjustment prior to the intake of the next one page data, intake of the data, sendout of the data to the facsimile 22, are repeated until the end of the job (step 20 to 22). After the reception has ended operations for transmitting the data remnant in the memory 19 are executed and all the acts related to the data handling are completed (step 16 to 18).

The present invention should not be construed as limiting into the embodiments as noted above. For example, herein the SSB signal transmitted from the transmitter 32, and the SSB tone signal 13*b* are assumed to be the upper side band. However, each may be the upper or lower side band. Further, it has been described in the embodiments above that the first signal 13a is produced by the voltage control oscillator 132 and thereby the frequency of the first signal 13a is changed, however, the same effect may be attained by setting that the voltage control oscillator may act as producer of the second signal 15a and thereby the frequency change may be carried out by the second signal 15a.

Further, as for the SSB tone 13a, the description in the above has exemplified its frequency 455 KHz, but any other desired frequency may be chosen according to the ease of obtaining a band filter.

Further in addition, in setting the frequency detection part, the description has exemplified that this part is defined of the comparator 171 and arithmetic unit 72, however, this art is substituted for such art that a voltage is converted into a frequency by F/V converting circuit and the converted voltage may be converted into a digital value by A/D convertor.

UTILIZATION IN THE INDUSTRY

The radio facsimile communication apparatus of the present invention offers the enablement of carrying out the facsimile communication by SSB radio system although there may be disagreement or error between the transmitter's frequency and the receiver's frequency. In other words, in contrast to the conventional art, the apparatus for SSB communication, generally accepted for the merit of low cost system, may be employed, and thereby more prevailing of the facsimile system will be facilitated.

We claim:

1. A radio facsimile communication system employing SSB (single sideband) communication method for transmitting facsimile data from a transmission point to a reception point, comprising:

a transmission apparatus at the transmission point including a transmitting unit for producing SSB signals by modulating facsimile signals supplied from a facsimile apparatus, and transmission means for transmitting a signal having a reference frequency "f" to the reception point;

a reception apparatus at the reception point including a receiving unit for demodulating the SSB signals to reproduce the facsimile signals and supplying a facsimile apparatus with the resultant facsimile signals, and correction means for comparing the reference frequency "f" of the signal received by the reception apparatus with a reference frequency "f" set at the reception point and adjusting the frequency of output signal of the reception unit based on the comparison result.

2. The radio facsimile communication system as defined in claim 1, wherein said transmission means is for producing a tone signal having said reference frequency "f" and for transmitting the tone signal to the receiving unit before the facsimile data starts transmitting.

3. The radio facsimile communication system as defined in claim 2, wherein, said reception apparatus comprises a frequency correction means at an intermediate stage located behind the receiving unit and prior to the facsimile apparatus;

said frequency correction means comprising:

a frequency detection means for detecting a reference frequency of the tone signal transmitted from the transmission means via aerial lines during transmission of the tone signal;

an arithmetic means for calculating a difference between a reference frequency f and an actually received reference frequency to thereby correct facsimile signals reproduced by the reception apparatus during transmission of the facsimile data.

4. The radio facsimile communication system as defined in claim 3, wherein said frequency correction means further comprises:

an SSB modulation means for producing a modulated SSB tone signal by subjecting the tone signal reproduced at the receiving unit to modulation by a first signal as a carrier wave during transmission of the tone signal;

an SSB demodulation means for producing demodulated SSB tone signal by demodulating the SSB signal with use of a second signal as beat signal;

a frequency detection means for detecting a frequency of the demodulated tone signal;

a frequency control means for changing the frequencies of the first and second signals according to a result of detecting the frequency of the tone signal by the frequency detection means for maintaining the changed state while the facsimile data is being received.

5. The radio facsimile communication system as defined in claim 1, further comprises a means for checking a corrected reference frequency produced at the reception point each time the transmission of data for covering one page of a documentary material is finished.

6. The radio facsimile communication system as defined in claim 5, further comprises a memory means, located in the transmission point between the transmitting unit and the facsimile apparatus, for storing the facsimile data while the reference frequency is being transmitted and for reading out in the order of the stored data after the transmission of the reference frequency is finished.

7. A radio facsimile communication apparatus, which comprises:

a tone means for producing a tone signal having a reference frequency;

a facsimile;

a signal conversion means for converting signals fed from the facsimile;

a transmission means for transmitting the signals output from the tone means and the signal conversion means in time-division format by SSB system.

8. A radio facsimile communication apparatus, which comprises:

a signal means for producing a signal having a reference frequency;

a signal conversion means for converting signals fed from a facsimile;

a switch means for switching and feeding the signals output from the signal means and the signal conversion means in time-division format to an SSB transmitter.

9. A radio facsimile communication apparatus, which comprises:

a reception means for receiving tone signal and facsimile signals transmitted in radio SSB system;

a frequency detection means for detecting a reference frequency of the tone signal;

a differential frequency detection means for comparing the reference frequency with a frequency detected by the frequency detection means and finding a differential frequency between these frequencies;

a frequency correction means for correcting frequency included in the facsimile signals, based on the found differential frequency;

a facsimile for recording the facsimile signals.

10. A radio facsimile communication apparatus, which comprises:

a frequency detection means for detecting a frequency of a tone signal fed from a reception means which receives the tone signal and facsimile signals transmitted in radio SSB system;

a differential frequency detection means for comparing a reference frequency with a frequency found by the frequency detection means and detecting a differential frequency between these frequencies;

a frequency correction means for correcting frequency of the facsimile signals, based on the found differential frequency.

11. A radio facsimile communication apparatus, which comprises:

a signal means for producing tone signal having a reference frequency;

a signal conversion means for converting signals fed from a facsimile;

a switch means for switching and feeding signals output from the signal means and the signal conversion means in time-division format to an SSB transmitter;

a frequency detection means for detecting a frequency of the tone signal fed from the SSB transmitter;

a differential frequency detection means for comparing a reference frequency with a frequency found by the frequency detection means and detecting a differential frequency between these frequencies;

a frequency correction means for correcting frequency of the facsimile signals, based on the found differential frequency.

* * * * *